US006986444B2

(12) United States Patent
Fuchs

(10) Patent No.: US 6,986,444 B2
(45) Date of Patent: Jan. 17, 2006

(54) DISPENSER FOR DISCHARGING A FLUID MEDIUM

(75) Inventor: Karl-Heinz Fuchs, Radolfzell (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 200 days.

(21) Appl. No.: 10/176,251

(22) Filed: Jun. 19, 2002

(65) Prior Publication Data

US 2002/0195464 A1 Dec. 26, 2002

(30) Foreign Application Priority Data

Jun. 23, 2001 (DE) ........................................ 101 30 368

(51) Int. Cl.
*G01F 11/42* (2006.01)

(52) U.S. Cl. ............................... 222/321.9; 222/321.7; 222/385; 222/542

(58) Field of Classification Search .............. 222/321.1, 222/321.7, 321.8, 321.9, 385, 383.1, 542, 222/569

See application file for complete search history.

(56) References Cited

U.S. PATENT DOCUMENTS 2,861,839 A * 11/1958 Mellon .................... 222/321.9
5,192,006 A * 3/1993 Van Brocklin et al. .. 222/321.9
5,271,532 A * 12/1993 Jumel et al. ............ 222/321.9
5,277,340 A * 1/1994 Van Brocklin ........... 222/321.7
5,709,324 A * 1/1998 Peronnet et al. ......... 222/321.9
6,010,039 A * 1/2000 Bougamont .............. 222/321.9
6,189,741 B1 * 2/2001 Behar ...................... 222/321.7
6,279,786 B1 * 8/2001 de Pous et al. .......... 222/321.9

FOREIGN PATENT DOCUMENTS

DE 1227198 10/1966
DE 440813 A1 8/1994
DE 3631341 C2 4/1997
DE 19859969 A1 6/2000
EP 571280 A1 11/1993
FR 2756546 A1 6/1998
FR 2756547 A1 6/1998

OTHER PUBLICATIONS

German Search Report, Apr. 25, 2002, No. 101 30 368.8.

* cited by examiner

*Primary Examiner*—Frederick Nicolas
(74) *Attorney, Agent, or Firm*—Quarles & Brady LLP

(57) ABSTRACT

The disclosure provides a fluid-tight, but non-releasable or only under a large force releasable connection between the delivery device of a dispenser and the medium reservoir of the dispenser. For the discharge of a fluid, preferably liquid medium, which can in particular contain a pharmaceutical substance, such a dispenser has at least two parts, firstly a medium container for storing the medium and secondly a delivery device fastenable to the medium container. For fastening together the medium container and the delivery device, fastening portions are formed on both parts. In the fastening portion there is a gap between the medium container and the delivery device. An elastically deformable ring fastener, preferably as a layer on the outside of the delivery device, is provided and its wall thickness, prior to installation, is larger than the gap dimension. Prior to the fastening together of the two parts, namely the medium container and delivery device, the plastically deformable ring fastener is fitted to one of the two parts.

27 Claims, 4 Drawing Sheets

DISPENSER FOR DISCHARGING A FLUID MEDIUM

BACKGROUND OF THE INVENTION

Figure 1:
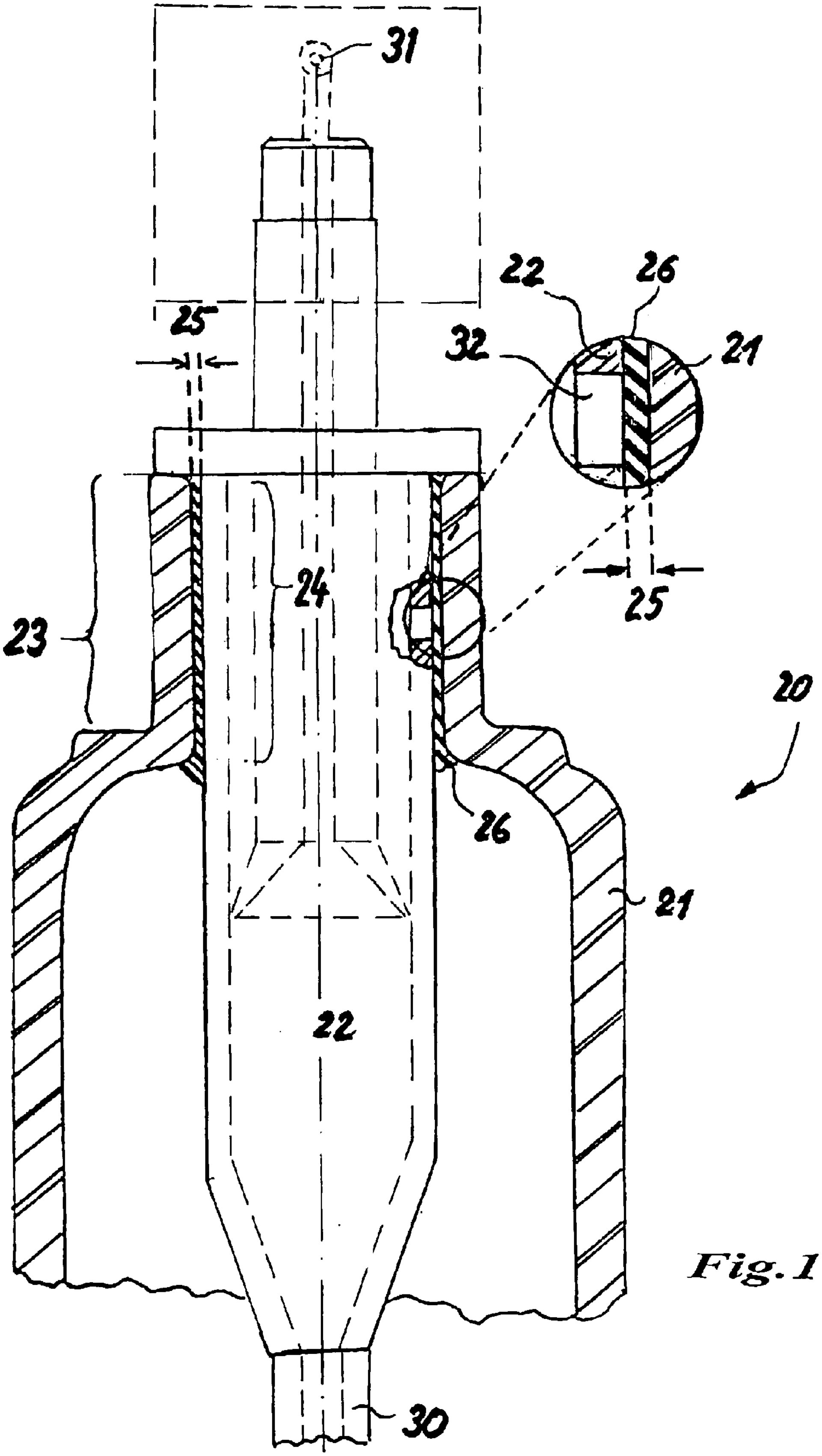

The present invention relates to a dispenser for discharging a fluid and preferably liquid, especially a pharmaceutical substance-containing medium.

In the case of such dispensers the medium is stored in a medium container. A delivery device, e.g. in the form of a plunger pump, is used for discharging the medium. The delivery device delivers the medium from the medium container to a discharge location, generally a discharge nozzle.

Such a dispenser is e.g. described in EP 571 280 B1.

In the case of such dispensers there must be a fluid-tight fastening of the medium container to the delivery device, so that the medium can only pass out of the medium container via the fluid path of the delivery device. For this purpose on both the medium reservoir and on the delivery device fastening portions are provided used for fastening the two parts to one another.

Such fastening devices generally suffer from the disadvantage of taking up a large amount of space. Usually a relatively large bottle neck is provided on medium containers. In the vicinity of the bottle neck a corresponding material convexity is required, so that it is possible through crimp rings or the like to fasten the delivery device to the medium containers. The construction of screw threads, such as are in part standard, is also very space-consuming. It is also possible to have a locking or snapping fastening of the delivery device to the medium container, e.g. by means of a type of intermediate ring or insert, as known from EP 571 280 B1, but this leads to a long construction. However, particularly with small volume medium containers, the design task is to produce the dispenser with a small number of easily manufacturable components, which must also be easily fitted and leading to a short construction.

OBJECT OF THE INVENTION

Thus, the object of the invention is to provide a fluid-tight, non-releasable or only under great force releasable connection between the dispenser delivery device and the dispenser medium reservoir.

SUMMARY OF THE INVENTION

In the case of a dispenser for discharging a fluid, preferably liquid medium and which more especially can contain a pharmaceutical substance, at least two parts are provided. Firstly there is a medium container for storing the medium and secondly a delivery device fastenable to the medium container. The delivery device is used for delivering medium, e.g. a dosed medium quantity, from the medium container to a discharge nozzle. For fastening together the medium reservoir and the delivery device fastening surfaces are formed on both parts.

According to the invention in the fastening area there is a gap between the medium container and the delivery device. A mostly elastically, but also somewhat plastically deformable ring fastener, whose wall thickness prior to installation is larger than the gap is used. This plastically deformable ring fastener is fitted to one of the two parts, i.e. medium container and delivery device, before they are fastened together. The ring fastener oversize is e.g. about 0.355 mm.

The ring fastener may comprise two areas. In the first area the ring fastener is constructed as a continuous annulus, i.e. with an uninterrupted circumferential sealing surface, whereas in the second area there is at least one slit in the ring. Therefore it is easier to be inserted under pressure in the bottle neck of the container without impairing the holding force. The slit allows to store the displaced oversize material and creates a reservoir of elasticity. The slit may preferably be substantially axially oriented, though a deviation therefrom of about 10° were found to be uncitical. The slit preferably has a width approximately corresponding to the wall thickness of the ring fastener, e.g. between half and double of the wall thickness. Particular advantage arises with constructions where the ratio of the length of the first area to that of the second area, in each case in the axial direction, is approximately 1 to 5 to 1 to 10.

In a further embodiment of the invention, the ring fastener is made from a plastics material, particularly manufactured by injection molding. The Shore hardness of the material used for the manufacture of the ring fastener is preferably approximately 50 Shore A. In a further development of the invention the ring fastener is directly and integrally applied to the fastening portion of the part on which it is constructed, i. e. the outer wall of the delivery device, which may be the pump cylinder. This is done by shaping softer plastic material on the delivery device during injection molding by a two-component injection molding process. Preference is given to variants of the invention in which the ring fastener is injection molded in the fastening portion of the delivery device. Thus, the fastening portion of the medium container is preferably constructed as a smooth-walled, short bottle neck.

According to developments of the invention the fastening portion of the delivery device is constructed as a cylindrical sleeve. The cylindrical sleeve is preferably enveloped by the fastening portion of the medium container.

It is also advantageous if at least one of the sides of the ring fastener facing the fastening portions is at least zonally scaled, particularly microscaled. Such a microscaling prevents a relative movement in the release direction of the connection between medium container and delivery device. This measure more particularly produces a particularly strong, difficultly releasable connection through the ring fastener.

The scaling permits a relatively easy fastening together of the two parts, but not a release thereof, because the scales permit a movement in the scaling direction, but block an opposing movement. The scales, which can be formed during injection molding, are for this purpose constructed in such a way that their low side is at the front in the insertion direction and the raised side is at the rear in the insertion direction. Such a microscaling is obtained more particularly by adding a scaling-forming material to that of the ring fastener during manufacture, e.g. by injection molding. The term microscaling is used if the raising of the scaling with respect to a planar outer contour is below 1 mm.

Additionally or alternatively to the formation of a scaling, it is possible to provide the plastics material forming the ring fastener with additives. These are in particular elasticity additives, preferably those which simultaneously produce a slid-preventing effect on the surface. Such additives can often also produce a soft touch or soft grip effect. The elasticity of the plastics material used is increased. Plastics usable for producing the ring fastener are e.g. polyethylene (PE), polypropylene (PP), etc. The elasticity-increasing effect of the additives is required during the pressing in of the ring fastener. As a result of the fact that the external diameter of the ring fastener may be larger than the container opening, a blocking action occurs. The high elasticity of the plastics material ensures that it is not possible to turn the plastics material with respect to the container and bring about a sliding movement. Instead there is a good adhesion of the ring fastener to the medium container surface in the vicinity of its bottle neck.

According to the invention it is advantageous if the connection between the medium container and the delivery device produced by means of the ring fastener has a fluid-tight construction. The latter also requires a careful choice of the material used for the ring fastener, because said material must be stable and dissolving-proof with respect to the medium stored in the medium container and its ingredients. In order to facilitate the introduceability of one part to be fastened with respect to the other, it can be advantageous if the material thickness of the ring fastener increases axially and in particular is wedge-shaped in cross-section. In a particularly simple manner, in the case of the ring fastener according to the invention the two parts can be interconnected by pressing.

The invention is described in greater detail hereinafter relative to an embodiment shown in the attached drawings, wherein represent:

FIG. 1 In a diagrammatic, part-sectional view a delivery device joined to a medium container by pressing.

Figure 2:
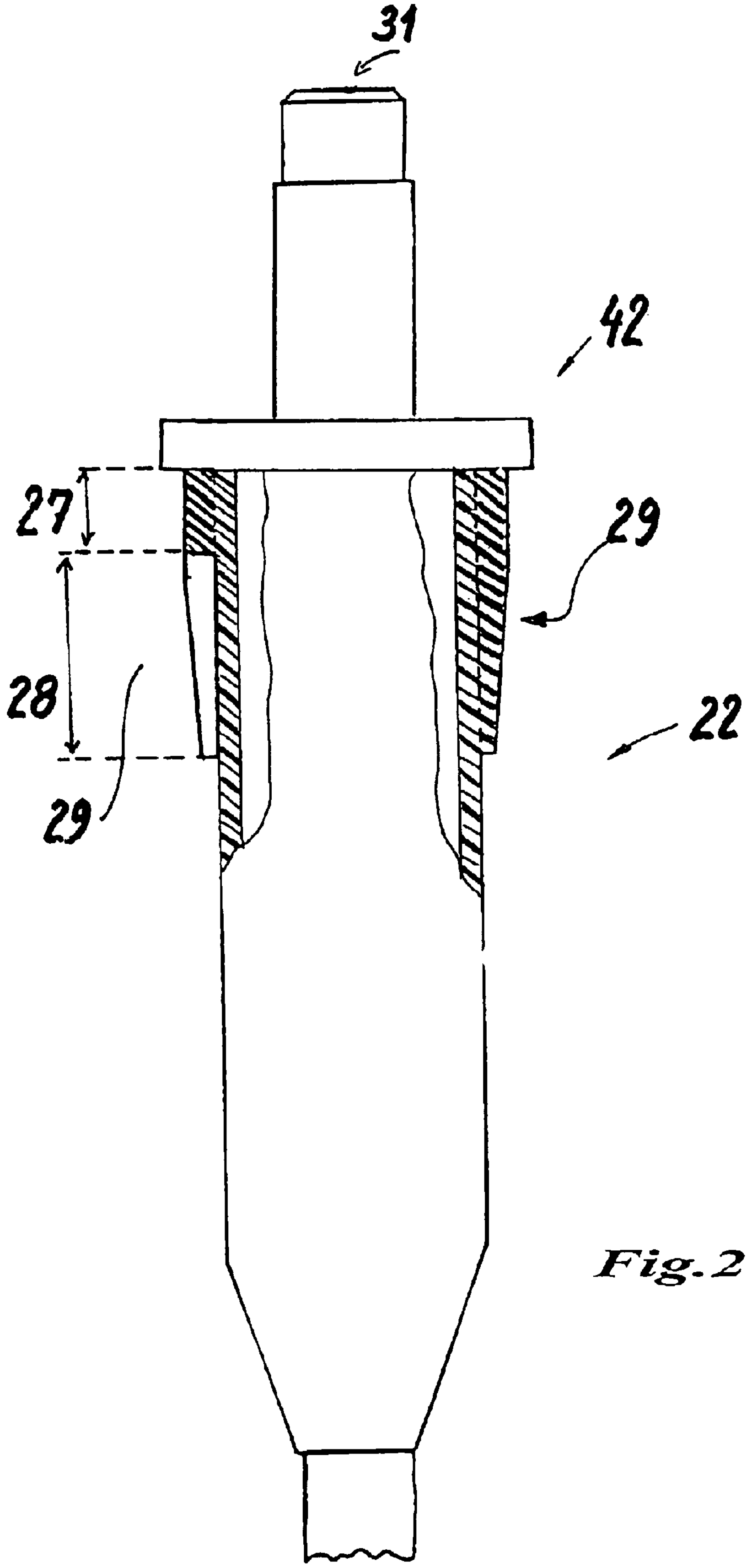

FIG. 2 A delivery device with a ring fastener layer injection molded onto said device in a diagrammatic, part sectional view.

Figure 3:
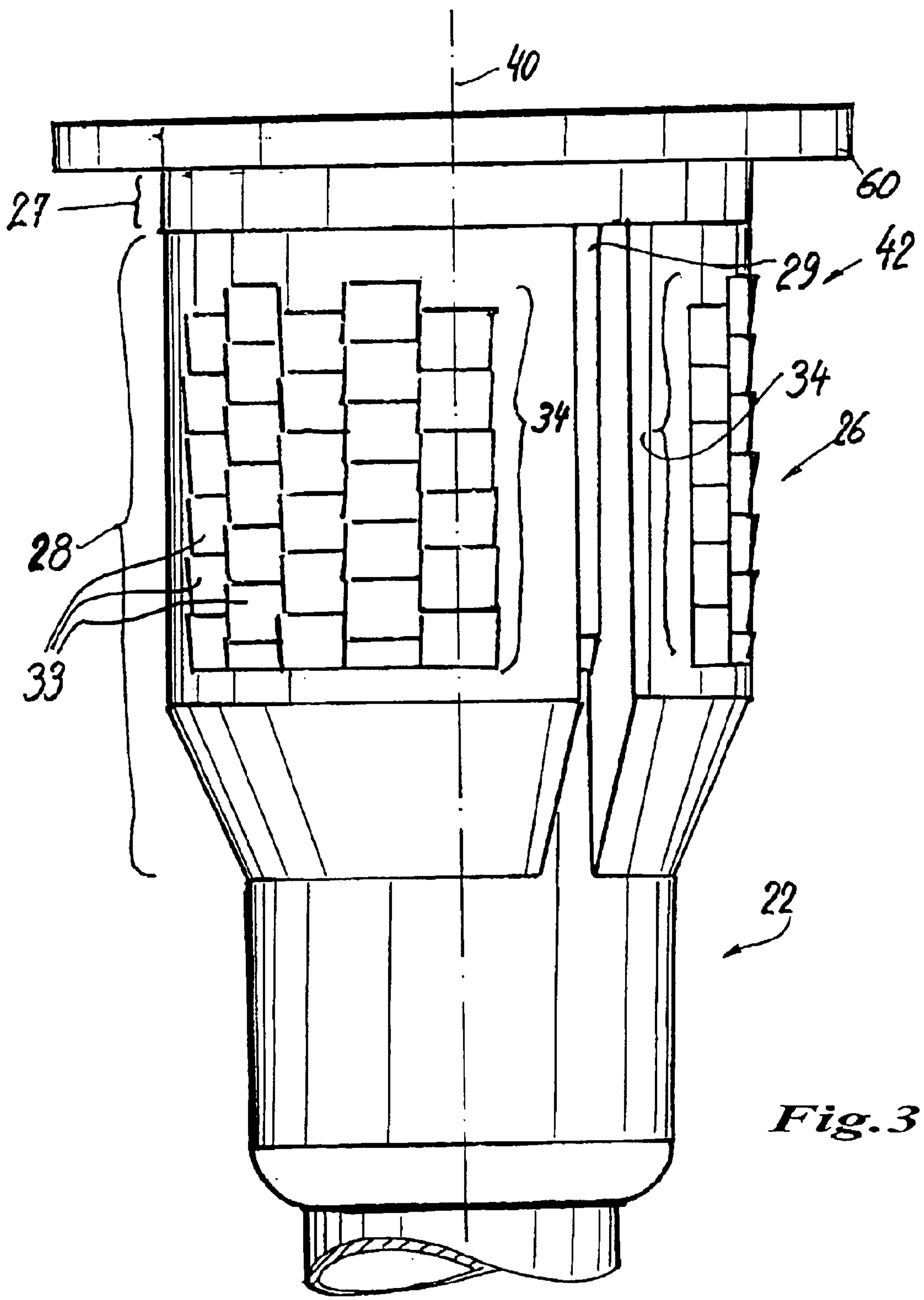

FIG. 3 A more detailed side view of the ring fastener with scaling.

Figure 4:
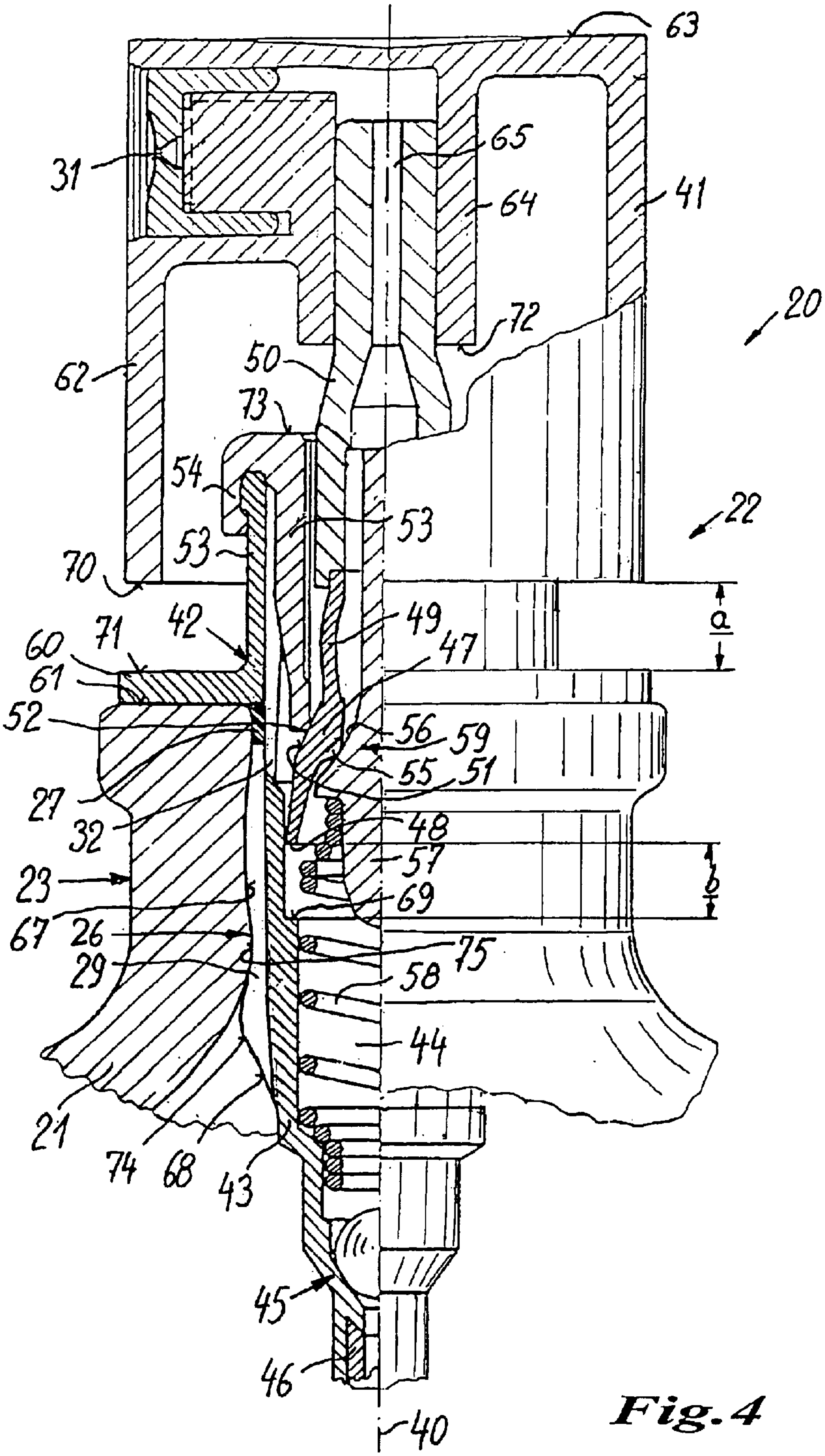

FIG. 4 A partial sectional side view of a dispenser using the fastener layer shown in FIG. 2 and 3

FIG. 1 shows in part sectional form the medium container 21 and delivery device 22 of a dispenser 20. The delivery device can e.g. be a plunger pump or some other pump means, which sucks by means of a suction pipe 30 medium stored in the medium container 21 and delivers it to the discharge opening 31, e.g. as a spray, on operating the delivery device 22. The discharge opening 31 can e.g. be an issuing opening, which issues into the nozzle, e.g. a spraying nozzle of a discharge mechanism or dispenser.

In FIG. 1 both the medium container 21 and the ring fastener 26 are shown in sectional form, whereas the delivery device 22 is shown in non-sectional form.

The medium container has a fastening portion 23, which is substantially cylindrical with a central axis 40 and which is a bottle neck. Opposite to the fastening portion 23 when, as shown, the delivery device 22 is in its ready-to-operate position fastened to the medium container 21, is located the fastening portion 24 of the delivery device 22. The fastening portions of the two parts have fastening surfaces facing each other which are extending in a mostly cylindrical shape around the central axis, not withstanding small deviations therefrom, e.g. because of draft angles. In order to produce the gap 25 between the inner edge of the fastening portion 23 of the medium container 21 and the fastening portion 24 of the delivery device 22, the corresponding diameters differ from one another by said gap dimension 25. Account can be taken of manufacturing tolerances in the vicinity of the two fastening portions 23, 24, where the resulting gap dimension is filled by the material of the ring fastener 26. Thus, the material of the ring fastener 26 creates a fluid-tight connection between the medium container 21 and the delivery device 22. Thus, apart form the fluid path in the delivery device 22, the medium container 21 is sealed in fluid-tight manner for the medium enclosed therein. The media stored in the medium container 21 can be cosmetics, such as perfumes, fragrances, etc., as well as media incorporating at least one pharmaceutically active substance. The pharmaceutical substances can in particular be Freund's adjuvants, opiates and pharmaceutical substances in general which are administerable in dosed form and which are in particular administered to body cavities, such as the mouth or nostrils.

The plastics material from which the ring fastener is made, is a soft, elastic and somewhat flowable material. It is chosen in such a way that as a result of elastic deformation on pressing together with the delivery device 22 into the medium container 21 it is displaced from the gap and extends into the container. In addition, it is also possible to make slits 29 in the ring fastener 26. The slits 29 do not extend over the entire axial length of the ring fastener 26. They are in fact limited to a specific partial length, which in the medium container in question is in the lower zone thereof and away from its opening. The top zone of the ring fastener is in the form of a closed ring in order to ensure fluid tightness. The substantially axially oriented slits 29 in the ring fastener 26 serve to receive the material of the ring fastener 26 displaced as a result of the smaller gap dimension 25. It creates thereby a reservoir of elasticity. However, it is also possible for a pressure compensating opening 32 of the delivery device 22 to issue in the vicinity of one of the slits 29. By means of the pressure compensating opening 32 the interior of the medium container 21 is connected via the delivery device to the atmosphere to enable discharge of the medium stored therein without forming a vacuum in the container 21. If the slit 29 is given an adequate width, elastically displaced material of the ring fastener 26 does not completely close the slit 29 and consequently there is always a fluid connection between the pressure compensating opening 32 and the interior of the medium container 21. As a function of the elasticity and flow behaviour of the material from which the ring fastener 26 is made, a gap width must be determined for this purpose. The gap width is approximately of a value corresponding to the material thickness, i.e. the radial diameter of the ring fastener 26.

As has already been stated, the wall thickness of the ring fastener 26 in its original state, i.e. when the delivery device 22 is not yet connected to the medium container 21, is larger than the gap dimension 25. If the medium container 21 is closed by pressing with the delivery device 22, as a result of the smaller gap 25 the ring fastener 26 is elastically deformed to create and maintain a considerable pressure between the fastening surfaces of the fastening portions sufficient to tightly hold the delivery device in the container opening. As a result of the deformation the relatively soft material of the ring fastener 26 is made to flow. The relatively soft material can be a plastics material, particularly one which is moldable by injection molding. The Shore hardness of the material of the ring fastener 26 is in a range between approximately 30 and 60 Shore A and is preferably approximately 50 Shore A. If the plastics material is PE or PP, said value for the material is correspondingly adjusted by adding plasticizers. It is particularly important for the material that during pressing it flows, so that the ring fastener 26 enters the gap resulting from the gap dimension 25 and fills the same. As a result of the flow process a certain amount of material can pass out of the gap towards the interior of the medium container. However, the material of the ring fastener 26, as a result of its composition, must not be applied in waves, sheared or otherwise deformed. It can also arise that a slight bead is formed by the material of the ring fastener 26 and is located at the lower edge of the fastening portion 23 of the medium container 21.

It must be borne in mind that as a rule, due to the manufacture, with bottle necks to be very precisely produced, following the upper edge there is a small, undesired, but scarcely avoidable internal diameter increase. Also in the area of this increase there must be a firm engagement of the material of the ring fastener 26 both on the delivery device and on the medium container 21, so as to ensure a reliable, fluid-tight connection between the two parts, which is attainable by a viscous flow behaviour of the ring fastener material.

FIG. 2 shows a discharge device 22 with a integral ring fastener 26 constructed by injection molding, particularly two-component injection molding. The ring fastener 26 comprises a first area 27 in the form of a closed ring and an area 28 in which there is at least one slit 29, which is substantially axially directed. The width of the slit 29 approximately corresponds to the material thickness. In delivery devices and dispensers in which the invention can be used, the ring fasteners 26 have an approximate length of 10 mm. The material thickness, i.e. the difference between the internal and external diameters of the ring forming the ring fastener 26, is approximately 1 to 1.5 mm. The gap dimension 25 between the internal diameter of the medium container 21 in the fastening portion 23 and the external diameter of the delivery device 22 in its fastening is approximately 0.5 mm. By means of the material thickness of 1 to 1.5 mm of the ring fastener 26, it is consequently possible to compensate clearances and tolerances in the pump casing and medium container.

To permit a very easy insertion of the ring fastener 26 and delivery device 22 into the opening and the fastening portion 23 of the medium container 21, the ring fastener 26 can be inclined and in particular have a wedge-shaped construction, the hypotenuse of the wedge being shaped on the outer side facing the medium container 22. The wedge shape in particular only extends within the slotted, second area 28. The ratio of the length of the slotted area 28 to the closed, ring-shaped, first area 27 of the ring fastener 26 is approximately 5 to 10 to 10 to 1. In the unslotted, upper area 27, the ring-shaped body has its full wall thickness over the entire length and with said portion serves to provide the fluid-tight connection between the medium container 21 and the delivery device 22.

It is advantageous to provide a scaling on the outside of the ring fastener 26 facing the medium container 21 in order to ensure an easy connection by pressing together of the two parts the medium container 21 and the delivery device 22 with the ring fastener 26 molded thereon, but at the same time to make an release of the connection as difficult as possible. The scaling is barbed and formed in such a way that the scales point in the direction opposite to the extraction or removal of the delivery device 22 from the medium container 21.

FIG. 3 shows on a larger scale a side view of a delivery device 22 with a ring fastener 26 molded onto the outside of the delivery device 22. The ring fastener 26 comprises an annular, closed, first area 27, where the ring fastener material is constructed in continuous form and a second, slotted area 28. Slits 29 are made at regular intervals within the slotted area 28. It is possible to have only a single slit on the circumference of the ring fastener 26. However, preferably there are several slits 29 arranged with a regular angular, mutual spacing. There can in particular be three to five slits. In the regions between the slits 29 of the second area 28 are formed scaling areas 34, which in each case comprise a plurality of microscales 33. The scales are constructed in such a way that at the end thereof facing the first area 27 they project by approximately 3/100 mm over the outer contour of the second fastening portion 24. The consequently oppose an extraction of the delivery device 22 from the medium container 21. The scales e.g. have a length of 1 mm and are arranged in juxtaposed, axially directed rows, adjacent rows being mutually displaceable by half a scale length. In the region between the slits 29 of the second area 28 of the ring fastener 26, can in each case be provided scaled areas 34, which form the preponderant part of the surface of the second area. The scaling on the surface of the ring fastener 26 is produced during the Molding process for said fastener, the shaping being obtained through the shape of the injection mold.

In order to ensure a very good adhesion and a limited slip tendency during movements between the ring fastener 26 and the medium container 21, it is possible to provide a very soft or so-called soft touch characteristic for the material of the ring fastener 26. The soft touch characteristic is generally obtained by adding a corresponding quantity of plasticizers and foaming agents in the region of the plastics material for the ring fastener 26. The concentration and dosage of the plasticizer are in particular dependent on the choice of the plastics material and that of the plasticizer. It may be necessary to establish by tests which plasticizer concentration should be present in the plastics material.

Two-component injection molding, in which in two directly succeeding working steps the two parts are produced by injection molding and more particularly in the same mold, is a preferred process for the formation of a ring fastener 26 on a delivery device 22. The delivery device 22 is made from a first, dimensionally stable plastics material, whereas the ring fastener 26 is usually also made from a plastics material, but which is plastically deformable and for this purpose has a Shore hardness of approximately 50 Shore A, i.e. from a somewhat different material to the casing of the delivery device 22. Two-component injection molding makes it possible to produce the ring fastener, together with its slotted area and the slits 29 in a single production step, namely the injection molding of the casing. The ring fastener 29 does not constitute a separate part, which has to be separately fitted at the installation stage.

Particularly in the case of small pumps with short delivery devices 22 and relatively short fastening portions 23 and 24, it is advantageous to use such ring fasteners 26. The overall height required for them for the formation of a reliable hold and a fluid-tight, permanent connection is only approximately 10 mm.

Having described, with reference to FIGS. 1–3, the fastening features for the delivery device in the medium container schematically and partially in detail, FIG. 4 shows a preferred embodiment of the dispenser using the features described before with reference to FIG. 2 and FIG. 3. It shows a dispenser 20 with a medium container 21 and a delivery device 22, comprising a pusher 41 and a pump body 42 with including a pump cylinder 43 surrounding a pump chamber 44. The lower end of the pump cylinder 41 houses a suction valve 45, designed as a ball valve and has an opening connected to a suction pipe 46 extending into the container.

In the pump chamber 44, a piston 47 is guided by a sealing lip 48. The piston consists of an annular sleeve with the sealing lip 48 on one end and a compressible hose-like sleeve portion 49 on the other end, which is fastened to a hollow pusher rod 50. In between sealing lip 48 and sleeve portion 49 there is a conical part, which has a double valve function. Its outside valve seat 51 cooperates with an inner lower edge 52 of a cylinder insert 53, which is in tight snap connection 54 with the pump cylinder 53 to form a ventilation valve. An inner edge 55 of the piston cooperates with a valve seat 56 of the piston rod 57 to form an outlet valve of the pump. A helical spring 58 urges the piston 57 with its valve seat 56 against the edge 55, thereby closing the outlet valve 59 and also the valve seat 51 against the sealing edge 52 in order to close the ventilation valve which is necessary to compensate the volume of the dispensed medium by ambient air.

The pump cylinder 53 has a flange 60 lying on the end face 61 of the bottle neck 23 of the medium container 21. The pump cylinder has a venting opening 32 in its outer wall, which is in communication with venting valve 51, 52.

The pusher has, in the embodiment shown here, the form of an inverted cup with a cylindrical jacket 62, an operating surface 63 and an inner hollow socket 64, which is in fluid connection with the outlet nozzle 31. The pusher rod 50 is pressed into the socket 64 and provides a fluid connection from the pump to the nozzle by its inner channel 65 and also transfers the operating force F from the pusher to the pump piston.

The outer wall of the pump body, namely in the embodiment shown here the pump cylinder 43, has an outer layer of the soft plastic material as described before. It is integral with the inner harder and more stable wall material of the pump cylinder as described with reference to FIG. 2 and is produced by a 2-component molding procedure. The layer is applied to the pump body and covers its outer wall from the lower side of the flange 60 to beyond the lower end of the fastening surface 67 of the bottle neck ending in a conical part 68. FIG. 4 shows one of the slits 29 which are formed in the layer 26 beginning at the annular, unslotted closed portion 27, thereby connecting the ventilation opening 32 to the inside of the container.

The delivery device 22 is mounted on the container 21 as follows:

After filling the container 21 with the medium the delivery device 22 is pushed from above into the container opening surrounded by the bottle neck 23. This is done by exerting a mounting pressure on the operating surface 63 of the pusher 41, e.g. by hydraulic plunger. Due to the oversize diameter of the layer 26 with regards to the container opening a considerable pressure will be necessary. This will cause the pump to be operated. Piston 47 will slide down in the pump chamber against the force of spring 58. Since the pump chamber 44 is not yet filled with liquid, but only with air, there will be only a very faible compression force in chamber 44. At the end of the pump stroke sealing lip 48 will abut a shoulder 69 in the pump cylinder causing the sleeve portion 49 of piston 47 to be compressed by bulging, thereby opening outlet valve 59. This allows the compressed air in chamber 44 to escape to channel 65 and nozzle 31. At the same time the ventilation valve 51, 52 has opened connecting the inside of the medium container with the atmosphere. The full mounting pressure exerted in direction F is however not transferred to the pump body via the piston 47, which may otherwise impair the function of the sealing lip 48. Therefore there are cooperating abutting or stop surfaces 70, 71 at the lower end of the pusher jacket 62 and the flange 60. Additionally or instead the lower face 72 of socket 64 could constitute such abutment or stop in cooperation with the upper face of 73 of insert 53. In order to assure this, the distance a between the stops 70, 71 or 72, 73 is only by a very small amount larger then the distance b between the sealing lip 48 and shoulder 69, both regarded in the unoperated rest position shown in FIG. 4. This ensures that the piston is only lifted and charged so much that the outlet valve 59 can open to prime the pump, but the full mounting force or pressure is directly transferred from pusher 41 via the stops or abutting surfaces 70, 71 or 72, 73 to the pump body.

When pressing the pump body into the bottle neck the somewhat oversized layer 26 deforms and is displaced elastically partially into the slits 29 and partially by forming a bead 74 inside the container. Both are forming elastic reserves to maintain a considerable holding force and pressure between fastening surface 67 of the bottle neck and the corresponding surface 75 of the layer 26. The slits which can be one or more, and which are parallel to the axis 40 or only slightly deviating therefrom, create expansion chambers which also compensate manufacturing tolerances and avoid undue stress on the outer wall, e.g. the pump cylinder 43. The holding force is strengthened by an outwardly curved shape of fastening 67 of the container opening creating projecting ring parts at the upper and lower end of the bottle neck as shown in FIG. 4.

At the end of the mounting the flange 60 is supported on the end face 61 of the container and the delivery device is thus fixedly mounted on the container.

When the mounting pressure is released spring 58 pushes back the piston rod and therewith the piston. The outlet valve closes and liquid is sucked into the pump chamber 44 through suction pipe 46. The venting valve which did also allow to escape a possible air pressure in the container due to the insertion of the delivery device is closed again and the delivery device is now completely tightening the container.

What is claimed is:

1. Dispenser for discharging a fluidic medium, comprising a medium container (21) for storing the medium, having a fastening portion (23) and a delivery device (22) for delivering the medium from the medium container to a discharge opening (31) and being fastened to the medium container (21) by pushing the delivery device and the container together under a mounting pressure along a fastening axis (40);

fastening surfaces (67, 75) on both the medium container and an outer wall element of the delivery device (22), extending around the fastening axis and substantially parallel thereto, at said fastening surfaces (67,75) the medium container and the delivery device are fastened to each other by a substantially radial pressure exerted on the fastening surfaces, a deformable fastener ring in form of a layer (26) being fixedly applied to the outer wall element of the delivery device and providing one of the fastening surfaces, the fastener layer being elastically deformed upon pushing the delivery device and the medium container forcedly together, the fastener layer (26) being integral with said outer wall element which is formed as a two-component injection molding piece with the deformable fastener layer made of a soft plastic material and a basic inner portion of the outer wall element made of a harder plastic material.

2. Dispenser according to claim 1, wherein the fastening axis is coincident with a central axis of the delivery device.

3. Dispenser according to claim 1, wherein the fastener ring is made from a plastics material containing elasticizing agents.

4. Dispenser according to claim 1, wherein a Shore A hardness of the material of the fastener ring is between 30 and 60.

5. Dispenser according to claim 1, wherein the fastening portion (23) of the medium container (21) is a bottle neck.

6. Dispenser according to claim 1, wherein at least one of the fastening surfaces facing the fastening portion being a scaled fastening surface, the scaling preventing a relative movement of said surfaces in a release direction which is contrary to a direction of said pushing while easing said pushing.

7. Dispenser according to claim 1, wherein the fastening surfaces are substantially cylindrical.

8. Dispenser according to claim 1, wherein the fastener ring is partly conical at its outside.

9. Dispenser according to claim 1, wherein the delivery device has, adjacent to the fastening surface of the delivery device, a flange abutting an end face of the medium container.

10. Dispenser according to claim 1, wherein the medium is a pharmaceutical substance.

11. Dispenser for discharging a fluidic medium, comprising a medium container (21) for storing the medium, having a fastening portion (23) and a delivery device (22) for delivering the medium from the medium container to a discharge opening (31) and being fastened to the medium container (21) by pushing the delivery device and the container together under a mounting pressure along a fastening axis (40);

fastening surfaces (67, 75) on both the medium container and an outer wall element of the delivery device (22), extending around the fastening axis and substantially parallel thereto, at said fastening surfaces (67,75) the medium container and the delivery device are fastened to each other by a substantially radial pressure exerted on the fastening surfaces, a deformable fastener ring in form of a layer (26) being fixedly applied to the outer wall element of the delivery device and providing one of the fastening surfaces, the fastener layer being elastically deformed upon pushing the delivery device and the medium container forcedly together, the fastener layer (26) comprising a sealing portion (27) being a substantially continuous annulus and a holding portion (28) having at least one slit (29).

12. Dispenser according to claim 11, wherein the at least one slit (29) is orientated substantially parallel to the fastening axis.

13. Dispenser according to claim 12, wherein the slit (29) has a width, which is between half and double the wall thickness of the ring fastener.

14. Dispenser according to claims 11, wherein the sealing portion (27) has an axial length between 10% and 30% of an axial length of the holding portion (28).

15. Dispenser for discharging a fluidic medium, comprising a medium container (21) for storing the medium, having a fastening portion (23) and a delivery device (22) for delivering the medium from the medium container to a discharge opening (31) and being fastened to the medium container (21) by pushing the delivery device and the container together under a mounting pressure along a fastening axis (40);

fastening surfaces (67, 75) on both the medium container and an outer wall element of the delivery device (22), extending around the fastening axis and substantially parallel thereto, at said fastening surfaces (67,75) the medium container and the delivery device are fastened to each other by a substantially radial pressure exerted on the fastening surfaces, a deformable fastener ring in form of a layer (26) being fixedly applied to the outer wall element of the delivery device and providing one of the fastening surfaces, the fastener layer being elastically deformed upon pushing the delivery device and the medium container forcedly together, the delivery device (22) being a manually operable pump having an operating pusher (41), a pump body (42) including a pump cylinder (43) and a pump piston, the pump body and the operating pusher having cooperating seating surfaces (70, 71, 72, 73) for transferring the mounting pressure exerted on the pusher to the pump body without exerting the full mounting pressure to the pump piston (47).

16. Dispenser according to claim 15, wherein the pump cylinder has an internal shoulder (69) for abutment of the pump piston(47) in order to open an outlet valve (59) mechanically, the seating surfaces (70, 71, 72, 73), the piston (47) and the shoulder (69) are arranged and dimensioned to allow, under the mounting pressure, the piston to abut the shoulder (69) and to open the outlet valve (59) without exerting the full mounting pressure to the piston.

17. Dispenser according to claim 15, wherein the at least one slit (29) is orientated substantially parallel to the fastening axis.

18. Dispenser according to claim 15, wherein the fastening axis is coincident with a central axis of the delivery device.

19. Dispenser according to claim 15, wherein the slit (29) has a width, which is between half and double the wall thickness of the ring fastener.

20. Dispenser according to claims 15, wherein the sealing portion (27) has an axial length between 10% and 30% of an axial length of the holding portion (28).

21. Dispenser according to claim 15, wherein the fastener ring is made from a plastics material containing elasticizing agents.

22. Dispenser according to claim 15, wherein the Shore A hardness of the material of the fastener ring is between 30 and 60.

23. Dispenser according to claim 21, wherein the scaled fastening surface has a barbed shape.

24. Dispenser according to claim 21, wherein the scaled fastening surface is produced by scaling forming agents added to a plastic material, of which the fastening surface facing the fastening portion is made.

25. Dispenser for discharging a fluidic medium, comprising a medium container (21) for storing the medium, having a fastening portion (23) and a delivery device (22) for delivering the medium from the medium container to a discharge opening (31) and being fastened to the medium container by pushing the delivery device and the container together under a mounting pressure along a fastening axis (40);

fastening surfaces on both the medium container and the delivery device, extending around the fastening axis and substantially parallel thereto, at said fastening surfaces the medium container and the delivery device are fastened to each other by a substantially radial pressure exerted on the fastening surfaces, the fastening surfaces (23, 24) being spaced from each other by a gap (25) between the medium container (21) and the delivery device (22), a deformable ring fastener (26) being provided, having a wall thickness prior to fastening which is larger than the gap (25) and being inserted in the gap between the fastening surfaces upon pushing the delivery device and the medium container forcedly together;

the ring fastener comprising a sealing portion (27) being a substantially continuous annulus and a holding portion (28) having at least one slit (29).

26. Dispenser for discharging a fluidic medium, comprising a medium container (21) for storing the medium, having a fastening portion (23) and a delivery device (22) for delivering the medium from the medium container to a discharge opening (31) and being fastened to the medium container (21) by pushing the delivery device and the container together under a mounting pressure along a fastening axis (40);

fastening surfaces (67, 75) on both the medium container and an outer wall element of the delivery device (22), extending around the fastening axis and substantially parallel thereto, at said fastening surfaces (67,75) the medium container and the delivery device are fastened to each other by a substantially radial pressure exerted on the fastening surfaces, a deformable fastener ring in form of a layer (26) being fixedly applied to the outer wall element of the delivery device and providing one of the fastening surfaces, the fastener layer being elastically deformed upon pushing the delivery device and the medium container forcedly together, the fastener layer (26) being integral with said outer wall element which is formed as a two-component injection molding piece with the deformable fastener layer made of a soft plastic material and a basic inner portion of the outer wall element made of a harder plastic material, the fastener layer (26) comprises a sealing portion (27) being a substantially continuous annulus and a holding portion (28) having at least one slit (29).

27. Dispenser according to claim 1, wherein the fastening surface (67) on the container is an inside of a bottle neck (23) and is slightly curved to have a smaller diameter at both axial ends of the fastening surface (67) than in the middle of said surface.

* * * * *